June 5, 1923.
H. HOPPES
STOCK FEED MIXER AND DISPENSER
Filed Dec. 17, 1920          2 Sheets-Sheet 1
1,458,058
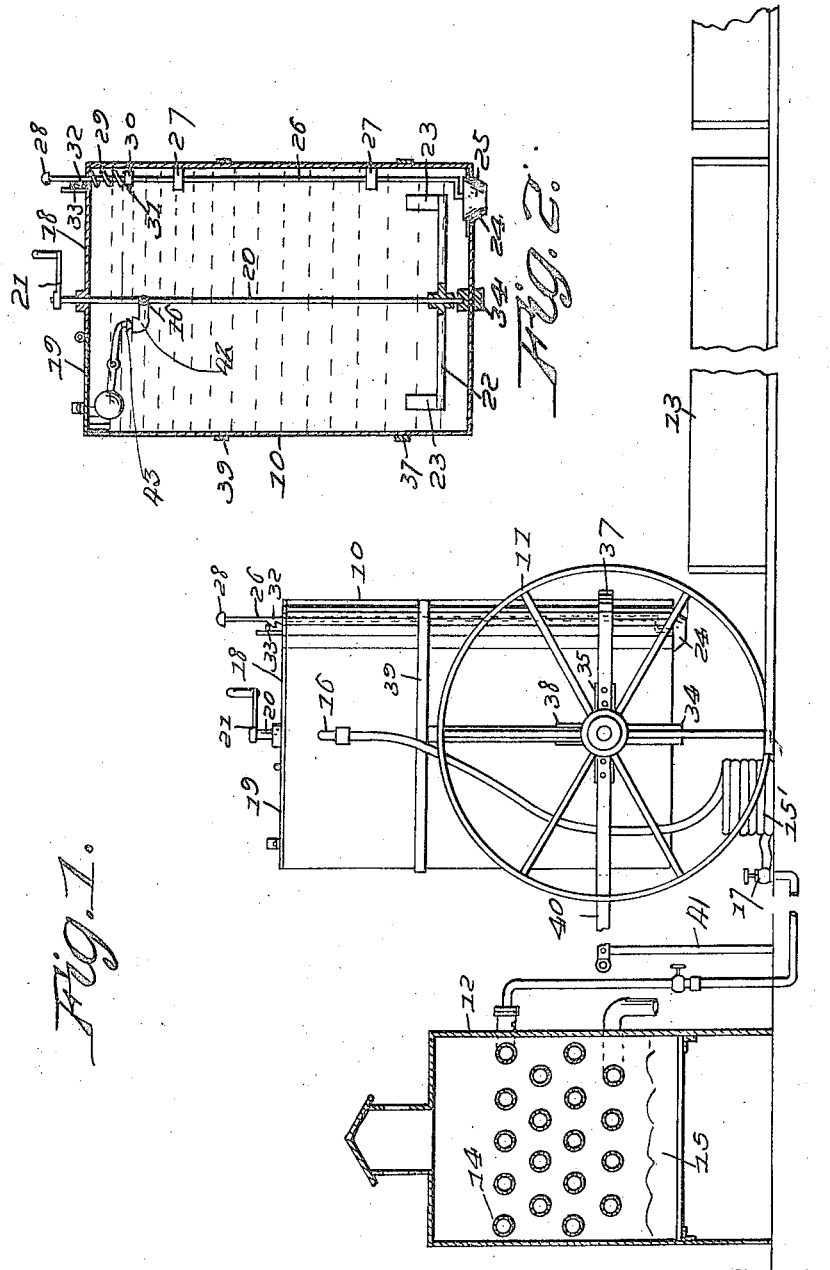
Inventor
H. Hoppes,
By G. Hume Talbert
Attorney June 5, 1923.
H. HOPPES
STOCK FEED MIXER AND DISPENSER
Filed Dec. 17, 1920  2 Sheets-Sheet 2
1,458,058
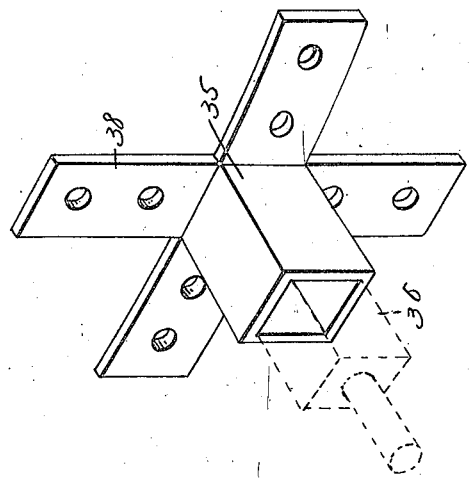
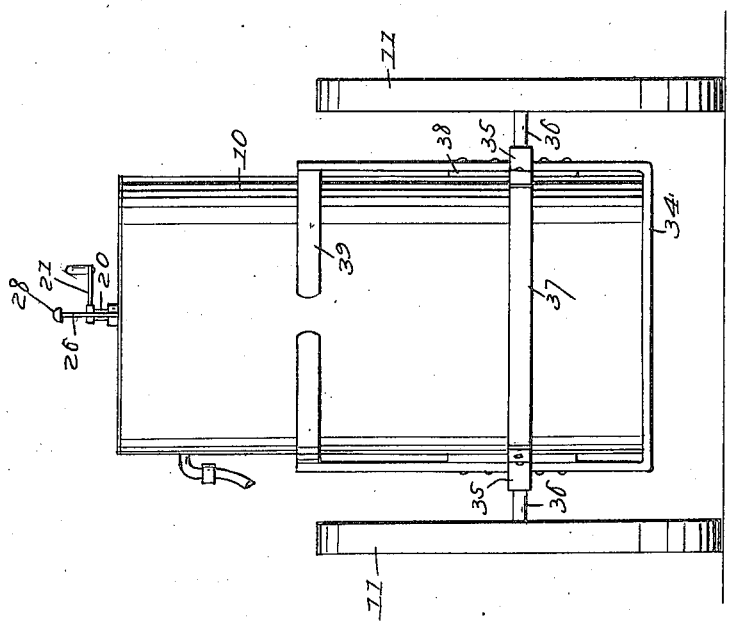

Patented June 5, 1923.

1,458,058

UNITED STATES PATENT OFFICE.

HENRY HOPPES, OF WILSONVILLE, NEBRASKA.

STOCK-FEED MIXER AND DISPENSER.

Application filed December 17, 1920. Serial No. 431,520.

*To all whom it may concern:*

Be it known that I, HENRY HOPPES, a citizen of the United States of America, residing at Wilsonville, in the county of Furnas and State of Nebraska, have invented new and useful Improvements in Stock-Feed Mixers and Dispensers, of which the following is a specification.

The object of the invention is to provide a comparatively simple and efficient means for preparing and dispensing or distributing stock food under conditions adapting it for use in all kinds of weather and with due regard to the deposit of the same in the feed troughs with the minimum of wastage and in proper form for consumption by the stock and in quantities regulable by the operator; and furthermore under conditions involving the minimum of effort and expenditure of time upon the part of the operator, so that the apparatus is adapted for use in economically suplying a large number of stock and where a number of different feed troughs must be supplied or charged from a common dispensing station; and with these objects in view the invention consists in a construcstruction and combination of parts of which a preferred embodiment is shown in the drawing, wherein:—

Figure 1 is a side view of an apparatus embodying the invention.

Figure 2 is a vertical sectional view of the mixing tank and its related parts.

Figure 3 is an end view of the same partly in section.

Figure 4 is a detail horizontal sectional view to show the mounting of one of the tank supporting wheels.

The tank 10 is preferably of portable construction being mounted upon suitable supporting wheels 11 to permit of movement with relation to a dispensing station 12 to supply a plurality of feed troughs 13, and in the construction illustrated the central station includes a heating apparatus consisting of coils 14 located above a fire box 15 or equivalent heating unit and having connected therewith a flexible hose or tube 15 in communication with the tank as at 16, so that water at the desired temperature to suit the conditions of the weather may be supplied to the tank as a means of moistening the meal or other stock feed and reducing it to a proper condition to be discharged into the feed troughs, suitable controlling valves 17 being provided for the convenience of the operator in regulating the flow of the water.

The tank is provided with a top having a stationary portion 18 and a hinged movable portion or cover 19, in the former of which is mounted the upper end of a spindle 20 having an upper terminal crank 21 and carrying an agitator 22, preferably provided with blades 23 operating near the bottom of the tank so that the feed may be finally mixed and uniformly moistened prior to delivery through a discharge opening 24 formed as illustrated in the bottom of the tank and fitted with a valve 25. To control the position of the valve to the end that the operator may unseat the same from time to time to permit of the discharge of mixed feed successively to the troughs there is provided a valve stem 26 extended through suitable guides 27 located on the side wall of the tank and provided at its upper end with a knob or handle 28, a spring 29 being employed to yieldingly hold the valve seated and being regulable in pressure by means of a collar 30 held in place at the desired adjustment by a set-screw 31. The valve stem is also preferably provided with a toothed rack 32 for engagement with a stud 33 so that the valve may be locked in an open position as when it is desired to discharge the feed while the agitator is rotated. The hinged cover 19 provides for the introduction of the material to enter into the composition of the feed and may normally remain closed as a means of protecting the same.

The tank is supported by a crank axle 34 to the extremities of which are attached castings 35 carrying the wheel spindles 36, and connected by a band 37 for the reception of the tank which rests upon the cross piece of the crank axle while extending upwardly from the castings are uprights 38 respectively carrying clamp arms 39 combining to form an upper band for receiving and embracing the tank to maintain it in its proper position on the truck. The handles 40 are attached to the castings 35 and from them depend legs 41 which are adapted to support the structure when the discharge opening is positioned over a trough or during the mixing of the contents of the tank, it being obvious that the raising of the handles when it is desired to move the tank will correspondingly lift the supporting legs so that the apparatus may be readily shifted from one trough to another within the radius afforded by the flexible hose by which connection is made with the central station without disconnection therefrom.

Since it is essential that some control be provided for the admission of water or other moistening agent to the tank, the inlet connection, indicated at 16, is formed with a terminal discharge mouth 42, to close which, when the water in the tank rises to a certain level, there is provided a float valve 43.

Having described the invention what is claimed as new and useful is:—

A stock feed dispensing apparatus embodying a portable tank, means for introducing a heated moistening agent into the latter, said means comprising an inlet connection disposed adjacent the top of the tank and formed with a terminal discharge mouth, a float valve operatively disposed with reference to said discharging mouth to close the latter upon the attainment of a certain level of the moistening agent, an agitator disposed adjacent the bottom of the tank, exposed manually operating means for said agitator, and a valve controlled discharge in the bottom of said tank.

In testimony whereof he affixes his signature.

HENRY HOPPES.